United States Patent [19]

Nyman

[11] 4,187,741
[45] Feb. 12, 1980

[54] POWER REGENERATIVE TRANSMISSION

[76] Inventor: Bengt E. Nyman, 5514 S. Crow's Nest Rd., Tempe, Ariz. 85283

[21] Appl. No.: 756,255

[22] Filed: Jan. 3, 1977

[51] Int. Cl.² ............................ F16H 3/74; B60K 9/00
[52] U.S. Cl. ..................................... 74/751; 180/54 R
[58] Field of Search .............. 74/751, 752 B; 280/217; 180/53 R, 70 R, 54 R

[56] References Cited

U.S. PATENT DOCUMENTS

| | | | |
|---|---|---|---|
| 2,241,680 | 5/1941 | Taylor | 74/751 |
| 3,665,788 | 5/1972 | Nyman | 74/751 |
| 3,734,222 | 5/1973 | Bardwick | 74/751 |
| 3,749,149 | 7/1973 | Bardwick | 74/751 |
| 3,886,810 | 6/1975 | Sugiyama et al. | 74/751 |

OTHER PUBLICATIONS

H. E. Merritt, Gear Engineering, 1971, pp. 182–191.

*Primary Examiner*—Lance Chandler
*Attorney, Agent, or Firm*—Cahill, Sutton & Thomas

[57] ABSTRACT

An inertia balanced, power regenerative transmission system for vehicles augments the power of the prime mover to the transmission output shaft during acceleration and recovers power from the drive shaft during deceleration. The transmission system includes torque sensitive gearing subsystems for transferring power intermediate a flywheel, the prime mover and the drive shaft. A decrease in rotational velocity of the prime mover output shaft and an accompanying decrease in kinetic energy of the vehicle is inherently coupled to increase the rotational speed and attendant kinetic energy of the flywheel, which energy is immediately available upon renewed acceleration of the vehicle.

18 Claims, 10 Drawing Figures

$N_S + KN_R = (K+1)N_C$ $T_S = -\frac{1}{K}T_R$ $T_C = \frac{(K+1)}{K}T_R$

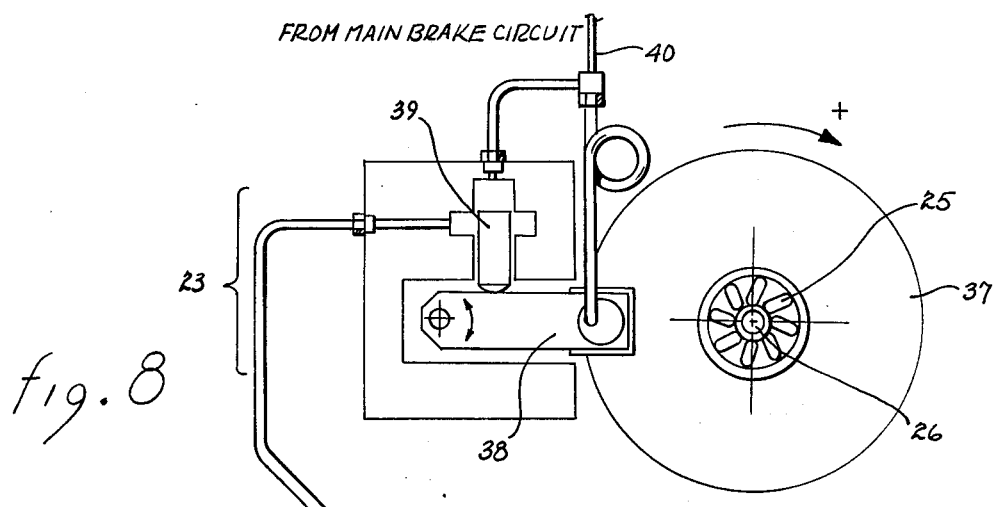
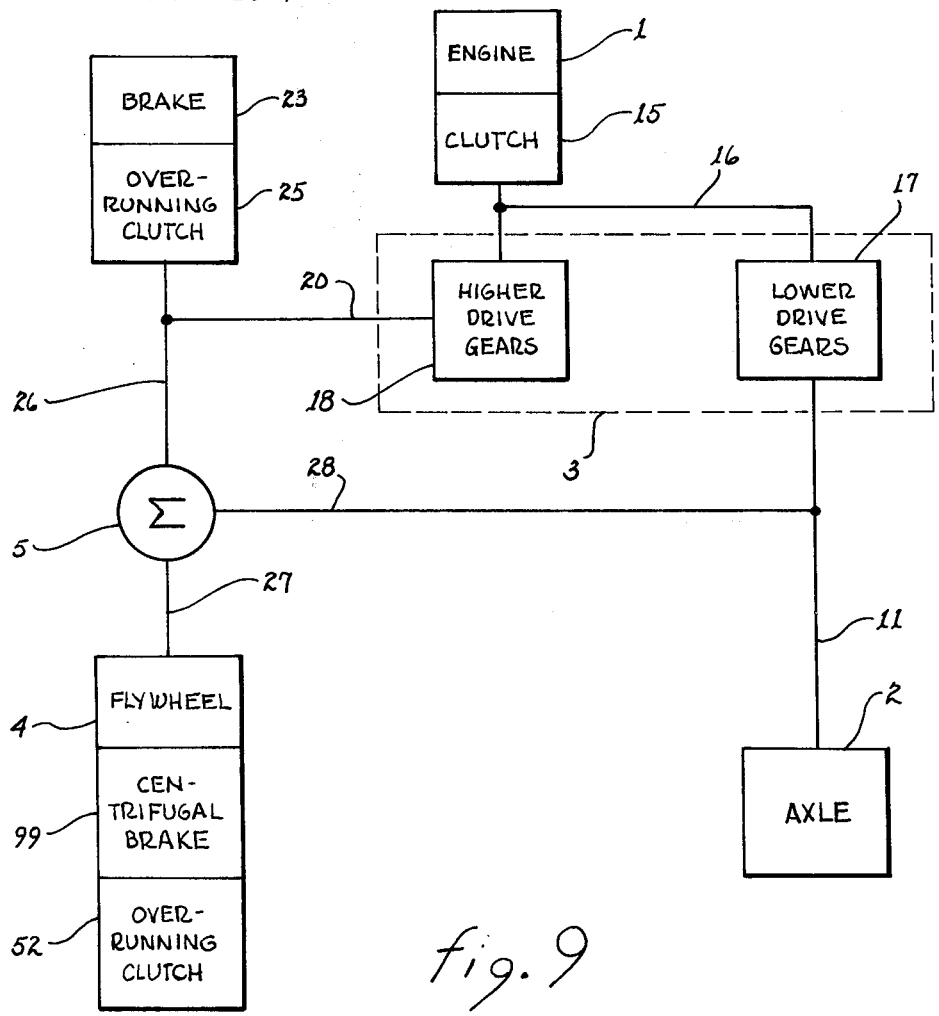

POWER REGENERATIVE TRANSMISSION

The present invention relates to energy conservation transmission systems and, more particularly, to vehicle transmission systems for recovering energy during deceleration, storing the recovered energy and providing a source of energy during renewed acceleration.

The use of flywheels for storing energy is well known and many types of prime mover systems have been conceived and developed which draw upon the energy of a spinning flywheel during a power demand imposed upon the prime mover. These known systems often have independent power sources to spin the flywheel. In other systems, the flywheel is connected to the prime mover output shaft or the ultimate power dissipation element whenever braking is to be effected such that rotational acceleration of the flywheel imposes a braking or decelerating function. The engineering philosophy attendant these systems has always been that of considering the energy storage capability of the flywheel as a supplemental or augmental source of power to the prime mover. The presently known prior art which teaches more or less sophisticated forms of the presently known flywheel energy storage systems described above include the following U.S. Pat. Nos.:
2,656,733, 2,525,946, 2,803,151, 2,935,899, 3,023,635, 3,208,303, 3,296,894, 3,493,066, 3,665,788, 3,882,950, 3,886,810, and 3,949,556.

It is therefore a primary object of the present invention to provide an improved inertia balanced, power regenerative transmission system for vehicles.

Another object of the present invention is to provide a transmission system having an energy storage capability which is replenished during deceleration and consumed during acceleration.

Yet another object of the present invention is to provide a transmission system tending to preserve the energy normally unproductively dissipated during deceleration of a vehicle.

Still another object of the present invention is to provide a transmission system for vehicles which augments the acceleration power available from the prime mover.

A further object of the present invention is to provide a transmission system for vehicles which permits the use of a lower powered prime mover without detracting from the acceleration rate of the vehicle.

A yet further object of the present invention is to provide a transmission system for a vehicle having a flywheel continuously mechanically interconnectable intermediate the prime mover and the drive shaft.

A still further object of the present invention is to provide a transmission system having a flywheel interconnected between the prime mover and drive shaft by torque sensitive gearing systems.

A still further object of the present invention is to provide a transmission system having a flywheel rotationally responsive to any change in rotational velocity of either the prime mover output shaft or the drive shaft.

These and other objects of the present invention will become apparent to those skilled in the art as the description thereof proceeds.

The present invention may be described with more specificity and clarity with reference to the drawings, in which:

FIG. 8 depicts representative brake components used in conjunction with a manually operated power regenerative transmission.

FIGS. 9 and 10 depict an alternate embodiment of an inertia balanced power regenerative transmission.

In conventional vehicular propulsion systems, the power of the prime mover, or engine, is transformed into kinetic energy of the vehicle and friction losses. Upon deceleration of the vehicle through braking action by the engine or upon application of friction brakes, the kinetic energy is dissipated. During subsequent acceleration, the dissipated energy must be replaced and the attendant friction losses must be overcome. Accordingly, the engine must repetitively generate power to replace not only the friction losses, which are unavoidable, but also the power dissipated each time deceleration occurs. Obviously, the deceleration power losses attendant conventionally powered vehicles are wasteful of energy generated by the engine.

Figure 1:
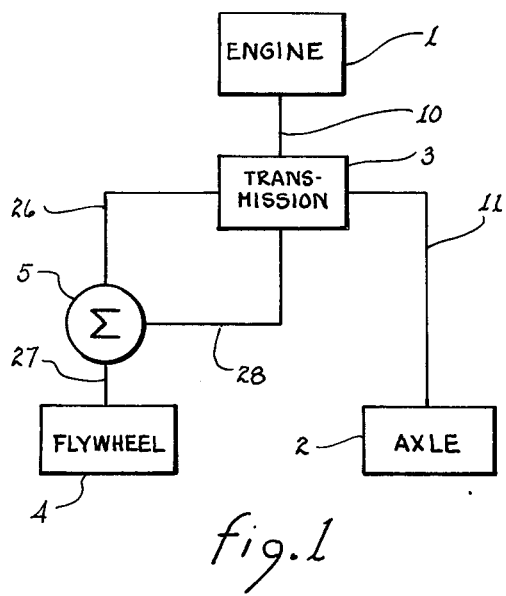
FIG. 1 illustrates the present invention in block format.

Referring to FIG. 1, there is shown in block format a transmission system incorporating the teachings of the present invention which reduces the energy waste of conventional propulsion systems. An engine 1 is connected to an axle 2, or other power takeoff output, through a transmission 3 in parallel with a mechanical summer 5. The summer includes: a member 26 connected to the input of transmission 3, a member 27 operatively connected to a flywheel 4; and, a member 28 connected to the output of the transmission. Engine output shaft 10 is rotationally coupled to the input of transmission 3 and drive shaft 11 rotationally couples the transmission output with axle 2.

The operation can be summarized as follows to facilitate understanding of the details of the invention. On acceleration of the engine, assuming the flywheel is spinning and assuming some initial vehicle speed, the power applied to output shaft 10 will be conveyed to transmission 3 and result in commensurate application of power to member 26, whereby power (and torque) is conveyed to summer 5. Simultaneously, the application of torque by member 26 will be sensed by the summer and the torque will be reflected to the remaining two members (27, 28) of the summer. The direction of the torque reflected to member 27 is in a direction to decelerate the flywheel. The direction of the torque reflected to member 28, connected to the output of the transmission, hence drive shaft 11, is in a direction to accelerate the vehicle. Subsequently, the flow of power from the prime mover to the drive shaft through the transmission during acceleration will be augmented by retrieval of energy from the flywheel through action of the summer and result in reduction or depletion of the energy stored in the flywheel.

When the vehicle (axle 2) decelerates, through the application of negative torque to member 26 of summer 5, the torque reflected to member 27 is in a direction to accelerate the flywheel while the torque reflected to member 28, connected to the output of the transmission, hence drive shaft 11, is in a direction to decelerate the vehicle. This power transfer will inherently effect a reversible transfer of the kinetic energy from the vehicle to storable kinetic energy within the flywheel.

During the initial startup of the vehicle when the flywheel is not spinning, the torque reflected through the summer to the flywheel would tend to try to rotate the flywheel in a direction opposite to the normal direction of rotation. This is prevented by the use of an overrunning clutch (not shown in FIG. 1), which keeps the flywheel from counter rotating. The power available during this initial startup is consequently limited to that of the prime mover, while the flywheel is held stationary and acts only as a torque member. This condition will only exist on initial startup. During the first deceleration after initial startup, the flywheel will be partially or fully charged and the energy change will become available during renewed acceleration.

Conceptually, the operation of the heart of the invention can be summarized as follows. Mechanical summer 5 is a three legged torque sensitive mechanism wherein the torques imposed upon all three members, or legs 26, 27, 28, are balanced on a continuing basis. As a result of the inherent torque balance, quantitatively controlled by the driver of the vehicle by increasing or reducing the rotational speed of the prime mover, the torque applied to the summer through member 26 will withdraw additional power from the flywheel to augment the power applied to the axle or, the power available at the axle will be withdrawn therefrom and at least partially applied to the flywheel.

Figure 2:
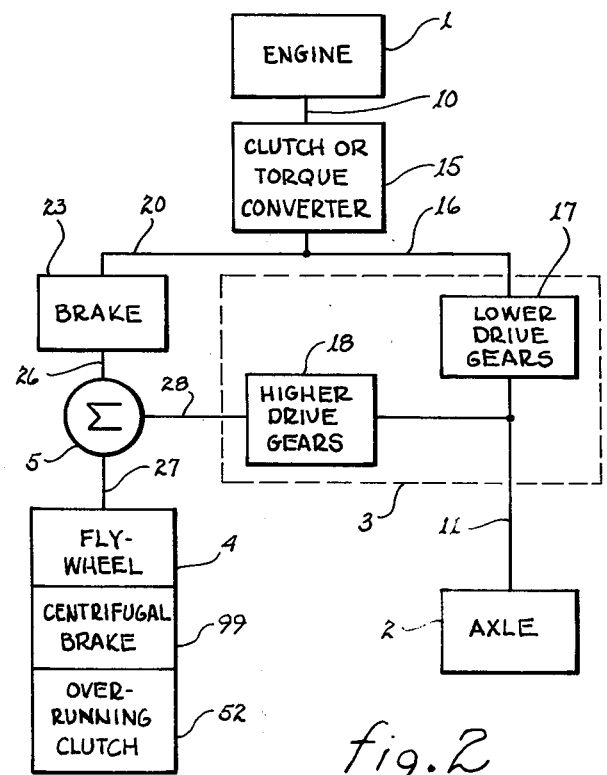
FIG. 2 depicts the components in block form of one embodiment of the present invention.

Turning now to FIG. 2, details of the invention will be reviewed. Output shaft 10 of engine 1 is connected to a clutch (for manual transmissions) or a torque converter 15 (for automatic transmissions). Although the invention is usable with either type of transmission, in the following discussion reference will be made to automatic transmissions as they are more likely to be used on implementation of the invention. The output of torque converter 15 is mechanically connected through shaft 16 to lower drive gears 17 (within transmission 3), drive shaft 11 and axle 2. Additionally, the output of the torque converter is connected through shaft 20 to brake 23 and to summer 5 through leg 26. Leg 26 interconnects brake 23 with summer 5 and serves as one of the three legs transferring torque into and out of the summer. Flywheel 4 is operatively connected to summer 5 through leg 27, which leg transfers torque intermediate the flywheel and the summer. Leg 28 is operatively connected through higher drive gears 18 (within transmission 3) to drive shaft 11, thereby transferring torque intermediate the summer and the drive shaft.

The detailed operation of FIG. 2 can be summarized as follows. Driving the vehicle in reverse or low gear, a gear ratio in lower drive gears 17 is automatically selected and engaged. Power is transferred from engine 1 through drive shaft 10, torque converter 15, shaft 16, lower drive gears 17, and drive shaft 11 to axle 2. When a lower drive gear is engaged, the higher drive gears 18 are all automatically disengaged leaving leg 28 disconnected and unable to transfer any torque to or from summer 5. Summer 5 is consequently without torque even though the speed of leg 26 is determined by shaft 20 which in turn is controlled by the output of the torque converter 15. Without any torque in the summer, the flywheel speed remains unaffected by the speed or change in speed of leg 26 and shaft 20. Consequently, while the transmission is in one of the lower drive gears, the transmission provides a conventional mode of propulsion without an inertia balanced, regenerative function.

As the vehicle speed increases, the automatic transmission will upshift from an engaged gear in lower drive gears 17, to an engaged first gear in higher drive gears 18. Actuation of the shift is automatic and based on reaching a predetermined speed of leg 28 in relation to other variables controlling preferred shift behavior. The shift is actuated within a range such that after actuation, the speed of leg 26 and shaft 20 produce a preferred speed of engine output shaft 10 immediately after upshift.

As the vehicle speed increases further, the transmission will upshift again to a higher gear in higher gears 18 and repeating the process described above.

As long as the transmission remains engaged in one of the higher drive gears 18, the function of the transmission is inherently inertia balanced and regenerative as described in reference to FIG. 1 above.

During initial startup, or when the flywheel has been fully discharged through acceleration or steady state driving, the overruning clutch 52 precludes the flywheel from rotating in the opposite direction and leg 27 is reduced to a stationary torque reaction member with respect to summer 5. At any indication of flywheel overspeed, damage is prevented by the governed or regulated dissipation of energy through operation of centrifugal brake 99. In example, prolonged downhill braking, which might tend to overspeed the flywheel, will be precluded by centrifugal brake 99. The brake will not only maintain a governed maximum flywheel speed but will also act as an operational brake and share the load imposed upon brake 23.

Figure 3:
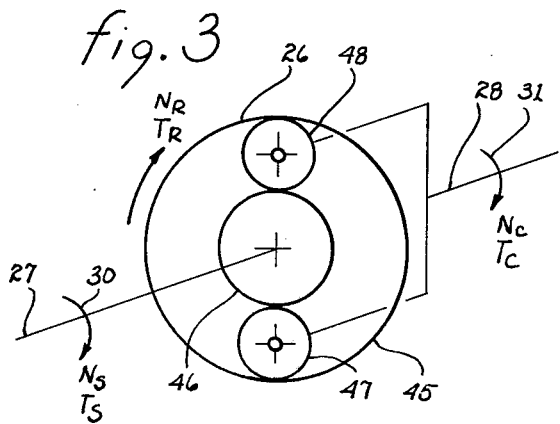
FIG. 3 is a pictorial representation, including the mathematical relationships, describing the mechanical summer.

FIG. 3 is a schematic representation of mechanical summer 5 and will be used in conjunction with FIG. 2 to describe the power transfer into and out of flywheel 4. The summer may be represented as a planetary gear system wherein; leg 26 corresponds to ring gear 45, leg 27 corresponds to sun gear 46 and leg 28 corresponds to planetary gears 47 and 48 (See FIGS. 4 and 10). Assuming an initial flywheel rotational rate or speed $N_s$, as depicted by arrow 30 about leg 27 and that the vehicle is accelerating, the rotation speed $N_c$ depicted by arrow 31 about leg 28 will at some point reverse the speed $N_r$ depicted by arrow 32 about leg 26 and cause the ring gear to rotate in the same direction as the sun gear (and flywheel 4 and leg 27). Mathematically, the relationship may be expressed as $$N_s + KN_r = (K+1)N_c$$

When this occurs, the transmission will shift gears from a gear in lower drive gear 17 to a gear in higher drive gear 18. Accordingly, a power flow from engine 1 to drive shaft 11 will occur through summer 5. The torque thereby imposed upon leg 26 will be sensed by summer 5. The torque applied to leg 26 is reflected to legs 27 and 28. The relative torques reflected are mathematically defined as:

$$T_s = -(1/K)T_r$$

and $$T_c = (K+1/K)T_r$$

The summer is thereby in an inertia balanced mode of propulsion where both the engine and the flywheel are contributing the energy necessary to sustain acceleration of the vehicle. Stated another way, the summer acts as a mechanical amplifier and delivers power from both the engine and flywheel to drive shaft 11 in response to torque delivered by the engine.

Referring again to FIG. 2, a low rate of vehicle deceleration can be achieved by discontinuing the engine power flow supplied to summer 5 through leg 26. In the case of zero engine power transferred through leg 26, there is zero torque reflected to legs 27 and 28. This occurs when the vehicle is coasting under zero engine power and without engine braking. When the engine throttle is returned to a fully closed position for application of engine braking, the torque transferred through leg 26 will be negative. (The terms positive and negative are construed as representative of torque in the direction of rotation and against the direction of rotation, respectively.) In this case, the torque transferred through leg 28 is negative, or in a direction to decelerate the vehicle. The torque imposed upon leg 27 is positive and will result in acceleration of the flywheel and transfer of the kinetic energy embodied in the vehicle to the flywheel with an accompanying braking effect upon the drive shaft.

Should deceleration of the vehicle from the effect of engine braking be insufficient, brake 23 is engaged. The brake is controlled by the normal brake circuit and may typically replace the conventional brakes on the drive wheels of the vehicle. The conventional brakes on the remaining wheels are unaltered and can be actuated on actuation of the brake. Brake 23 is consequently used in conjunction with other vehicle wheel brakes, but can be used on a priority basis which preferences the use of it alone, whenever it is sufficient, in order to maximize the amount of vehicle energy recovered by the flywheel. At emergency stops, or deceleration beyond the capability of energy absorption by the flywheel, additional braking power is supplied by the conventional vehicle wheel brakes.

On actuation of brake 23, energy will be transferred to the flywheel in the following manner. The resulting negative torque applied to leg 26 and sensed by summer 5 produces a positive torque in leg 27 to increase the acceleration rate of leg 27 and the attendant rotation rate of the flywheel. At the same time, the continuing torque balance effected within the summer is translated as a negative torque to leg 28 and acts upon drive shaft 11 through higher drive gears 18 as a braking function.

The effectiveness of the regenerative process of recovering kinetic energy from the vehicle and storing this energy in the flywheel is defined as: the energy effectively accelerating the flywheel compared to the energy received from the decelerating vehicle. Mathematically, the effectiveness is:

$$E = \frac{N_s \times T_s}{N_c \times T_c} \text{ where } T_c = (K+1)T_s$$

$$\therefore \frac{N_s \times T_s(K+1)}{N_c \times T_s} = (K+1)\frac{N_s}{N_c}$$

The losses are represented primarily by the energy dissipated in the brake 23. By maintaining as low as possible a speed on leg 26 while decelerating the vehicle, the regenerative effectiveness can be optimized. As the rotational speed of leg 26 approaches zero, the energy regenerative effectiveness theoretically approaches 100 percent and nearly all of the kinetic energy derived from the vehicle becomes stored energy in the flywheel.

The integrated time average of the relative rotational speed of legs 26 and 28 is the primary variable is determining the overall average regenerative effectiveness.

Power downshifts, within higher drive gears 18 located between summer 5 and drive shaft 11 are consequently instrumental in the effort to maintain a positive but as slow as possible rotation of leg 26 while decelerating the vehicle.

The downshifts are, like the upshifts, automatic and induced by sensing the rotational speed of leg 26 (ring gear 35), or other appropriate variable, resulting in desirable shift behavior.

By calculation, the average inertia balanced, regenerative effectiveness of the system shown in FIG. 2 is approximately 50 to 60 percent. Applying this effectiveness to a vehicle with a fuel economy of 11 miles per gallon in the city and 20 miles per gallon on the highway would increase the gas mileage rate in the city to about 16 to 17 miles per gallon. The highway mileage would be unaffected as there is no energy stored in the flywheel during long range steady state driving conditions.

Figure 4:
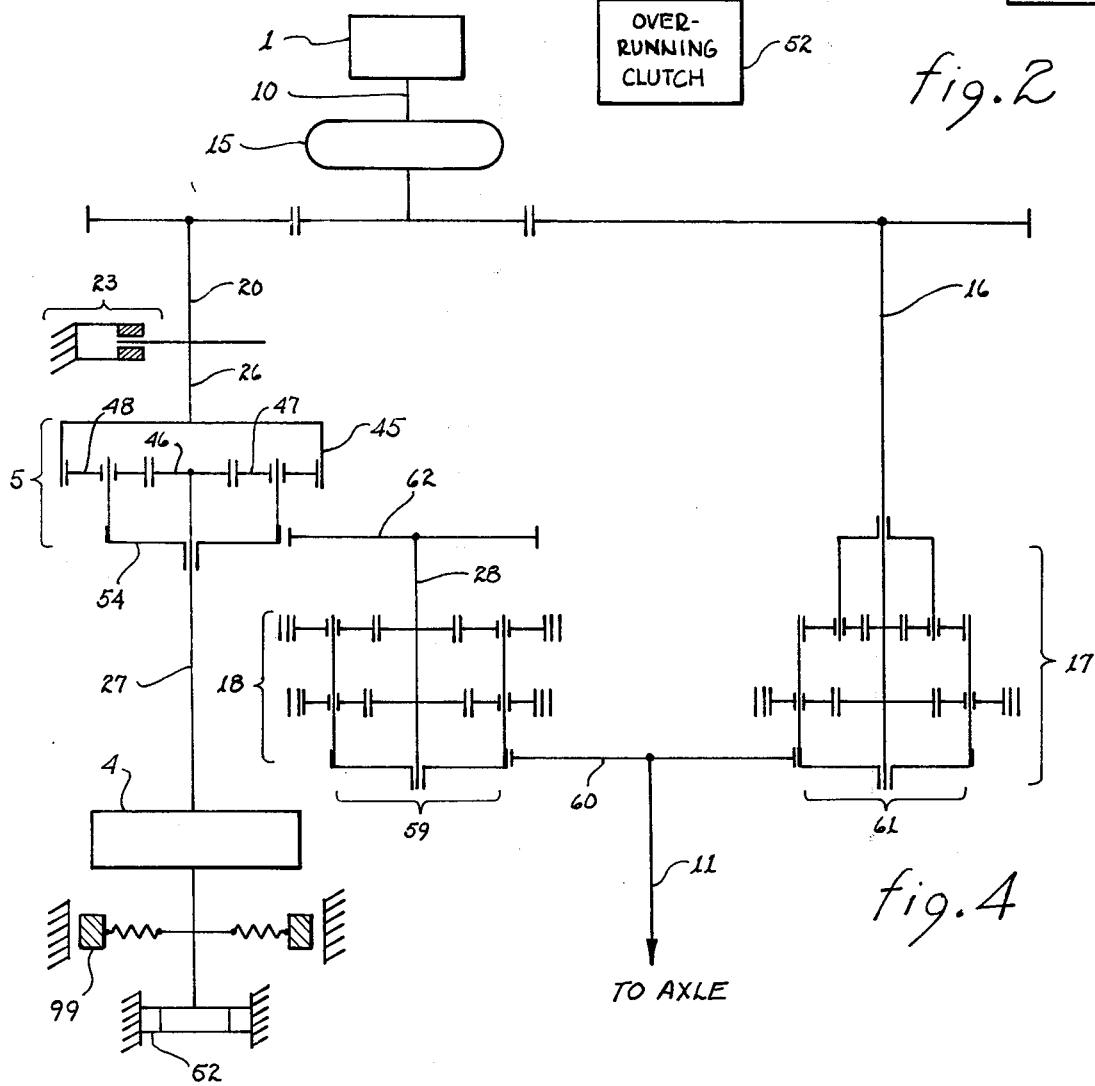
FIG. 4 depicts an example of a physical arrangement of the power regenerative transmission of the present invention.

An example of a more detailed physical arrangement of the automatic power regenerative transmission is depicted in FIG. 4. Herein, the higher drive gears 18 are performed by one, two or more planetary gear systems 59, disposed intermediate leg 28 of summer 5 and a gear 60 attached to drive shaft 11. A gear 62 meshing with gear 54 of summer 5 transmits torque and power intermediate planetary gear sets 59 of higher drive gears 18 and the summer. Lower drive gears 17 are depicted as a reverse and a low gear ratio planetary gear system 61 meshing with gear 60. All the drive gear ratios are depicted as conventional automatically controlled planetary gear systems whereby the use of brake bands locking or releasing one planetary gear member in relation to the transmission housing will engage or release the appropriate drive ratio.

Figure 5:
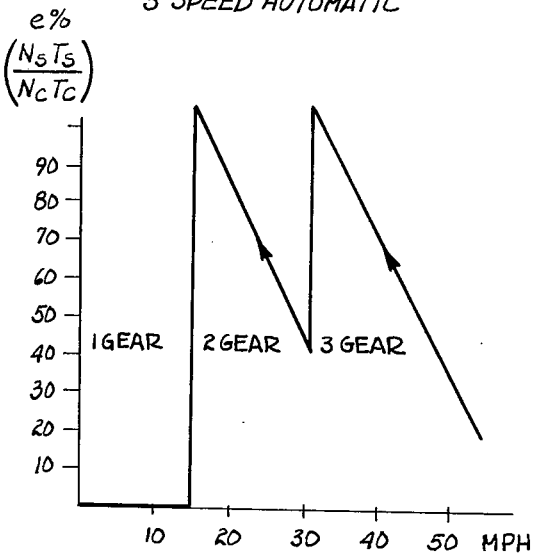
FIGS. 5 and 6 are graphs depicting the typical effectiveness of the energy recovery available from an automatic three speed power regenerative transmission incorporating the present invention.
Figure 6:
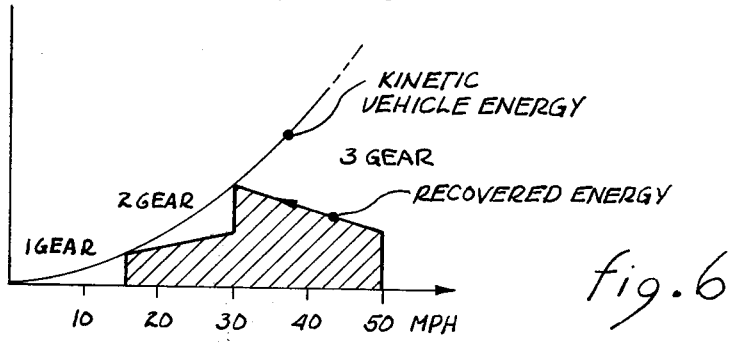
Figure 7:
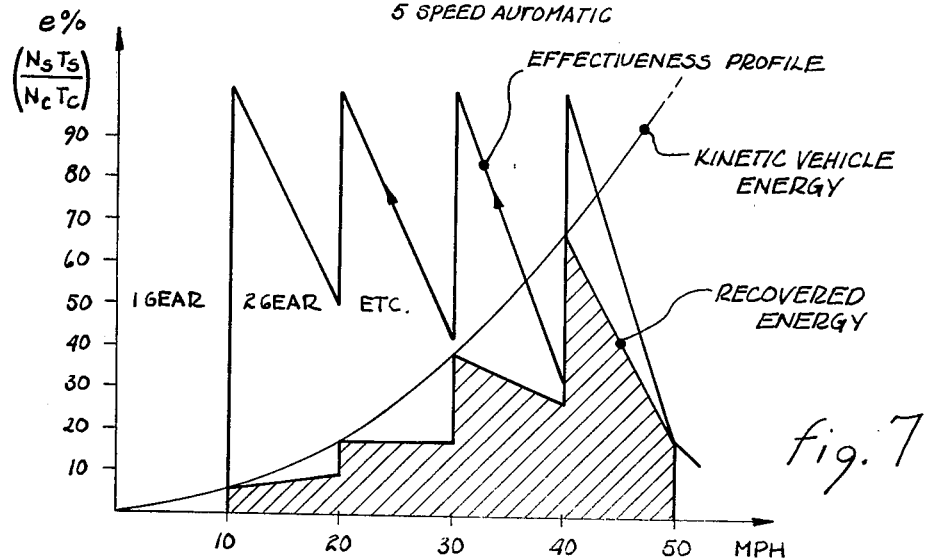
FIG. 7 is a graph depicting the typical effectiveness of and the energy recovery available from an automatic five speed power regenerative transmission incorporating the present invention.

The regenerative effectiveness and energy contribution to acceleration of the vehicle by the spinning flywheel is diagrammatically depicted in FIGS. 5, 6 and 7. FIGS. 5 and 6 show effectiveness and energy recovery of an automatic three speed transmission. FIG. 7 shows the same parameters for a five speed transmission. Upon acceleration of the engine to develop power, the torque imposed upon leg 26 of the summer is translated into a power demand from leg 27. Immediately, energy from the spinning flywheel is transferred to leg 28 to augment the power applied by the prime mover to the drive shaft. Accordingly, for any given rate of acceleration, the contribution of energy by the flywheel reduces the power demand imposed upon the engine and the fuel consumption of the engine is less than that of conventional vehicles. The transfer of energy from the flywheel will continue until acceleration of the vehicle is purposely stopped or until all of the energy of the flywheel has been utilized.

The size and rotation rate of the flywheel is configured to have an energy storage capability which matches the kinetic energy of the vehicle lightly loaded and at maximum speed. For efficiency reasons, the flywheel should be encapsulated within a vacuum.

For manual transmissions, wherein an automatic downshift will not occur, braking to a standstill may happen in any gear, including sometimes neutral. This will affect the regenerative effectiveness of the transmission and will tend to lower the effectiveness compared to that of an automatically shifted transmission. The manual transmission concept, however, is basically the same as that of the automatic transmission except for replacing the torque converter with a clutch and the automatically shifted planetary gear ratios with manually controlled constant mesh gears.

In the hands of a driver who downshifts to utilize engine braking, the regenerative effectiveness of the arrangement will be the same as that of the automatic. When braking without downshifting, however, the concept is restricted to regenerate the energy available within the gear engaged during the deceleration. If, for example, using a manual transmission the vehicle is brought from 50 miles per hour to standstill in its highest gear (declutched at low speed) the regenerative effect would be lost after the point where leg 28 has slowed down to a speed such that leg 26 reaches a standstill, which would probably happen at a vehicle speed of around 30 miles per hour. This would make unavailable the energy otherwise recovered below 30 miles per hour. Judging from FIG. 6 or 7, the energy recovered would be approximately ⅔ of the total available recoverable energy. This would make the regenerative effectiveness approximately ⅔ of that of the more optimized automatic transmission, or approximately 35 to 40 percent.

To accommodate continued deceleration, though not regenerative, below the point where leg 26 reaches a standstill, brake disc 37 in brake 23 can be fitted to leg 26 via an overrunning clutch 25, as shown in FIG. 8. The overrunning of this clutch allows leg 26 to freely change its direction of rotation after having been brought to a standstill by brake 23. The power to stop the vehicle will, however, after reaching this point, have to come from brakes other than brake 23. If in certain manual transmission applications the loss of brake 23 upon reaching this point is unacceptable, a brake transfer function has to be accomplished.

One workable mechanism facilitating the brake transfer is also shown in FIG. 8. Brake 23 includes a disc 37 disposed intermediate a pair of caliper brake pads and actuator 38. The brake pads and actuator are mounted to be free to regulate the brake transfer valve 39 upon change of direction of rotation of leg 26. On change of direction of leg 26, overrunning clutch 25 will free leg 26 to start rotating in the opposite direction while brake disc 37 with caliper brake pads and actuator 38 will move back to allow the opening of valve 39, thereby connecting the main brake circuit 40 to the conventional drive wheel brakes through brake line 41, or other brakes selected to make up for the loss of brake 23.

Figure 10:
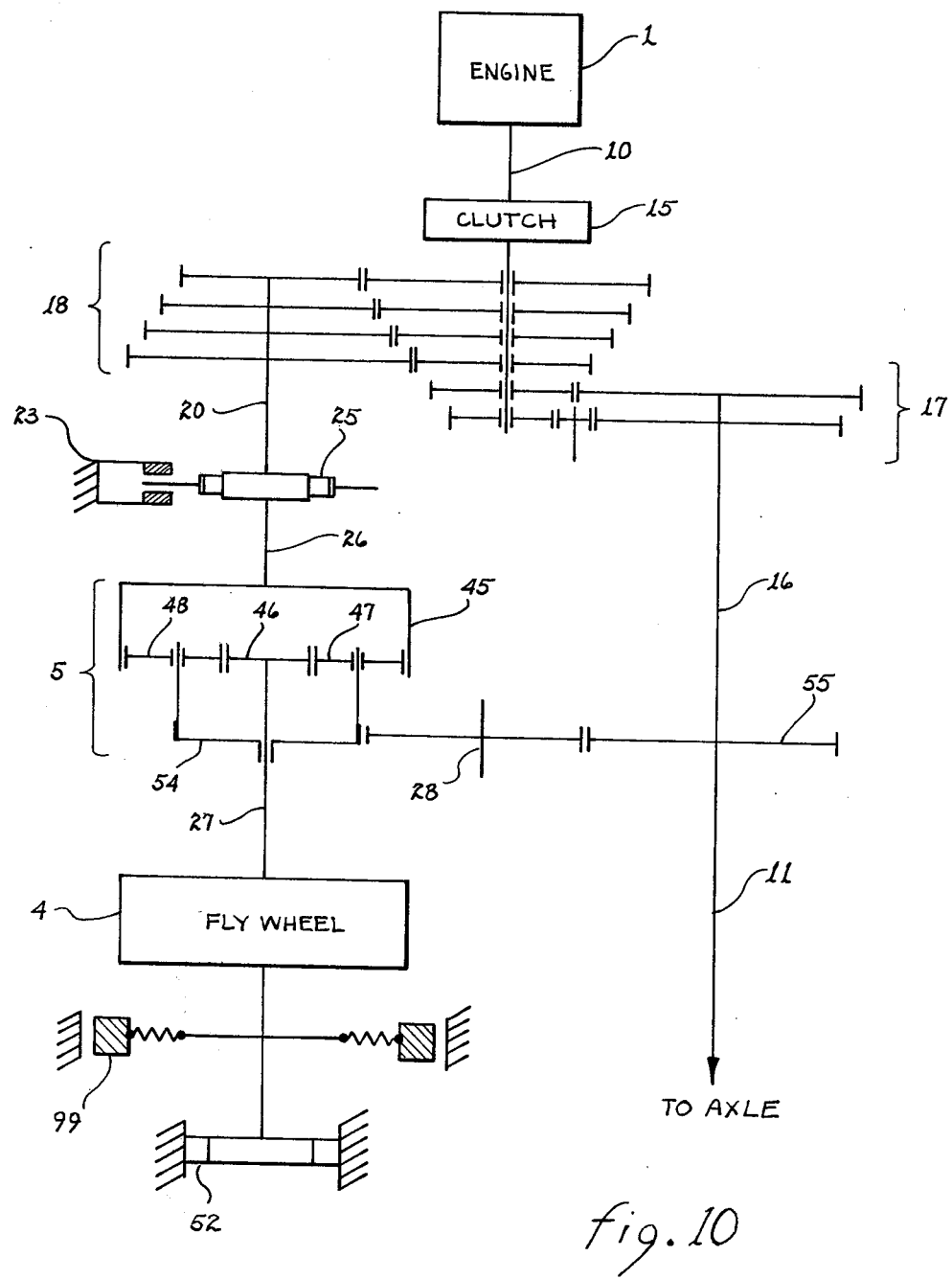

For use as a manual transmission, or other uses, where the increase in effectiveness by the use of power downshifts will not be systematically utilized, an alternate configuration of the basic concept may be used. FIGS. 9 and 10 show a power regenerative transmission where higher drive gears 18 are located intermediate clutch 15 and leg 26. The concept provides inherent inertia balanced, regenerative power transfer in all modes of operation above the point of brake transfer.

FIG. 10 shows one physical arrangement where leg 26 is attached to ring gear 45 of summer 5. Sun gear 46, meshing with ring gear 45 through planetary gears 47, 48 is mounted upon leg 27 driving flywheel 4. Planetary gears 47 and 48 are rotatably mounted upon gear 54 which gear is rotatably mounted upon leg 27. A further gear 55 secured to drive shaft 11 meshes indirectly with gear 54 via leg 28 (which may be a meshing gear). An overrunning clutch acting as a one-way brake 52 precludes counter rotation of the flywheel during steady state conditions, at which time leg 27 serves simply as a reaction member for summer 5. Centrifugal brake 99 precludes over speeding of the flywheel and may contribute braking effort to brake 23 during prolonged downhill braking.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A power regenerative transmission system for augmenting the power generated by the prime mover of a vehicle during acceleration of the vehicle drive shaft and recovering the kinetic energy of the vehicle during deceleration, said system comprising in combination:
   a. a transmission disposed intermediate the prime mover and the drive shaft for transmitting power therebetween;
   b. flywheel means for receiving, storing and transmitting energy;
   c. torque sensitive gearing means for preempting the power flow through said transmission during acceleration and deceleration of the drive shaft in response to the torque sensed, said torque sensitive gearing means including torque responsive means comprising:
      i. a first leg in rotational communication with the prime mover for transmitting and sensing the torque present at the output shaft of the prime mover;
      ii. a second leg in rotational communication with the drive shaft for transmitting and sensing torque to and from the drive shaft; and
      iii. a third leg in rotational communication with said flywheel means for transferring energy into and out of said flywheel means in response to power transfer between said first and second legs;
   d. brake means disposed intermediate said first leg and the output shaft of the prime mover for braking said first leg;
   whereby, the energy stored within said flywheel means is transferred to the drive shaft during acceleration to augment the power generated by the prime mover and the kinetic energy of the vehicle is recovered by said flywheel means during deceleration of the vehicle.

2. A power regenerative transmission system for augmenting the power generated by the prime mover of a vehicle during acceleration of the vehicle drive shaft and recovering the kinetic energy of the vehicle during deceleration, said system comprising in combination:

a. a transmission disposed intermediate the prime mover and the drive shaft for transmitting power therebetween;
b. flywheel means for receiving, storing and transmitting energy;
c. torque sensitive gearing means for preempting the power flow through said transmission during acceleration and deceleration of the drive shaft in response to the torque sensed, said torque sensitive gearing means including torque responsive means comprising:
  i. a first leg in rotational communication with the prime mover for transmitting and sensing the torque present at the output shaft of the prime mover;
  ii. a second leg in rotational communication with the drive shaft for transmitting and sensing torque to and from the drive shaft; and
  iii. a third leg in rotational communication with said flywheel means for transferring energy into and out of said flywheel means in response to power transfer between said first and second legs;
d. brake means disposed intermediate said first leg and the output shaft of the prime mover for braking said first leg; and
e. a clutch means for limiting the torque applied by said brake means to one direction of rotation;

whereby, the energy stored within said flywheel means is transferred to the drive shaft during acceleration to augment the power generated by the prime mover and the kinetic energy of the vehicle is recovered by said flywheel means during deceleration of the vehicle.

3. The system as set forth in claim 1 including rotational speed governing means for said flywheel means.

4. A power regenerative transmission system for augmenting the power generated by the prime mover of a vehicle during acceleration of the vehicle drive shaft and recovering the kinetic energy of the vehicle during deceleration, said system comprising in combination:
a. a transmission disposed intermediate the prime mover and the drive shaft for transmitting power therebetween;
b. flywheel means for receiving, storing and transmitting energy;
c. rotational speed governing means for said flywheel means;
d. one way clutch means for limiting the direction of rotation of said flywheel means to one direction;
e. torque sensitive gearing means for preempting the power flow through said transmission during acceleration and deceleration of the drive shaft in response to the torque sensed, said torque sensitive gearing means including torque responsive means comprising:
  i. a first leg in rotational communication with the prime mover for transmitting and sensing the torque present at the output shaft of the prime mover;
  ii. a second leg in rotational communication with the drive shaft for transmitting and sensing torque to and from the drive shaft; and
  iii. a third leg in rotational communication with said flywheel means for transferring energy into and out of said flywheel means in response to power transfer between said first and second legs;
f. brake means disposed intermediate said first leg and the output shaft of the prime mover for braking said first leg;

whereby, the energy stored within said flywheel means is transferred to the drive shaft during acceleration to augment the power generated by the prime mover and the kinetic energy of the vehicle is recovered by said flywheel means during deceleration of the vehicle.

5. The system as set forth in claim 1 wherein said torque sensitive gearing means comprises a planetary gear system having a ring gear, a sun gear and planetary gears interconnecting the ring gear and the sun gear.

6. A power regenerative transmission system for augmenting the power generated by the prime mover of a vehicle during acceleration of the vehicle drive shaft and recovering the kinetic energy of the vehicle during deceleration, said system comprising in combination:
a. a transmission disposed intermediate the prime mover and the drive shaft for transmitting power therebetween;
b. flywheel means for receiving, storing and transmitting energy;
c. torque sensitive gearing means for preempting the power flow through said transmission during acceleration and deceleration of the drive shaft in response to the torque sensed, said torque sensitive gearing means comprising a planetary gear system having a ring gear, a sun gear and planetary gears interconnecting the ring gear and the sun gear and including torque responsive means comprising:
  i. a first leg in rotational communication with the prime mover for transmitting and sensing the torque present at the output shaft of the prime mover, said first leg being coupled to the ring gear;
  ii. a second leg in rotational communication with the drive shaft for transmitting and sensing torque to and from the drive shaft, said second leg being coupled to the planetary gears; and
  iii. a third leg in rotational communication with said flywheel means for transferring energy into and out of said flywheel means in response to power transfer between said first and second legs, said third leg being coupled to the sun gear;

whereby, the energy stored within said flywheel means is transferred to the drive shaft during acceleration to augment the power generated by the prime mover and the kinetic energy of the vehicle is recovered by said flywheel means during deceleration of the vehicle.

7. A power regenerative transmission system for augmenting the power generated by the prime mover of a vehicle during acceleration of the vehicle drive shaft and recovering the kinetic energy of the vehicle during deceleration, said system comprising in combination:
a. an automatic transmission including a torque converter, lower drive gears and higher drive gears, said transmission being disposed intermediate the prime mover and the drive shaft for transmitting power therebetween;
b. flywheel means for receiving, storing and transmitting energy;
c. a planetary gear system having a ring gear, a sun gear and planetary gears interconnecting the ring gear and the sun gear for preempting the power flow through said transmission during acceleration and deceleration of the drive shaft in response to the torque sensed, said planetary gear system including torque responsive means comprising:

i. a first leg coupled to the ring gear in rotational communication with the prime mover for transmitting and sensing the torque present at the output shaft of the prime mover;

ii. a second leg coupled to the planetary gears in rotational communication with the drive shaft for transmitting and sensing torque to and from the drive shaft; and iii. a third leg coupled to the sun gear in rotational communication with said flywheel means for transferring energy into and out of said flywheel means in response to power transfer between said first and second legs;

whereby, the energy stored within said flywheel means is transferred to the drive shaft during acceleration to augment the power generated by the prime mover and the kinetic energy of the vehicle is recovered by said flywheel means during deceleration of the vehicle.

8. The system as set forth in claim 7 including shaft means for coupling the output of the torque converter to said torque sensitive gearing means and to the lower drive gears and wherein the higher drive gears are coupled intermediate said second leg and the drive shaft.

9. The system as set forth in claim 8 further including brake means disposed intermediate said shaft means and said torque sensitive gearing means.

10. The system as set forth in claim 9 further including a clutch means for limiting the torque applied by said brake means to one direction of rotation.

11. The system as set forth in claim 9 wherein said flywheel means includes brake means for limiting the speed of said flywheel means and overruning clutch means for limiting rotation of said flywheel means to one direction.

12. The system as set forth in claim 5 wherein said transmission comprises a manual transmission including a clutch connected to the output shaft of the prime mover.

13. The system as set forth in claim 12 wherein said transmission comprises a first range of gears interconnectable intermediate the prime mover and the drive shaft and a second range of gears interconnectable intermediate the prime mover and said torque sensitive gearing means.

14. The system as set forth in claim 13 including a brake and clutch means disposed intermediate said second range of gears and said torque sensitive gearing means.

15. The system as set forth in claim 14 wherein said flywheel means includes brake means for limiting the speed of said flywheel means and overrunning clutch means for limiting rotation of said flywheel means to one direction.

16. The system as set forth in claim 1 wherein the relative rotational speeds of said first, second and third legs are defined by the equation $N_s + KN_r = (K+1)N_c$, where $N_r$ is the rotational speed of said first leg, $N_s$ is the rotational speed of said second leg, $N_c$ is the rotational speed of said third leg and K is a constant.

17. The system as set forth in claim 1 wherein the torque of said second leg is defined by the equation $T_c = ((K+1)/K)T_r$, where: $T_c$ equals the torque of said second leg, $T_r$ equals the torque of said first leg and K is a constant and wherein the torque of said third leg is defined by the equation $T_s = -(1/K)T_r$, where: $T_s$ is the torque of said third leg, $T_r$ is the torque of said first leg and K is a constant.

18. The system as set forth in claim 1 wherein the average inertia balanced regenerative effectiveness of said system is defined by the equation $E = (N_s T_s / N_c T_c)$, where: E is the effectiveness in percent, $N_s$ is the rotational speed of said third leg, $T_s$ is the torque at said third leg, $N_c$ is the rotational speed of said second leg, and $T_c$ is the torque at said third leg.

* * * * *